(12) United States Patent
Bellegarda et al.

(10) Patent No.: US 6,697,779 B1
(45) Date of Patent: Feb. 24, 2004

(54) COMBINED DUAL SPECTRAL AND TEMPORAL ALIGNMENT METHOD FOR USER AUTHENTICATION BY VOICE

(75) Inventors: Jerome Bellegarda, Los Gatos, CA (US); Devang Naik, San Jose, CA (US); Matthias Neeracher, Cupertino, CA (US); Kim Silverman, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 451 days.

(21) Appl. No.: 09/677,385

(22) Filed: Sep. 29, 2000

(51) Int. Cl.[7] ............................................... G10L 17/00
(52) U.S. Cl. ...................................... 704/246; 704/250
(58) Field of Search ................................ 704/231, 236, 704/239, 241, 246, 250; 379/88.02

(56) References Cited

U.S. PATENT DOCUMENTS

| | | | |
|---|---|---|---|
| 5,125,022 A | * 6/1992 | Hunt et al. ..................... 379/88 |
| 5,127,043 A | * 6/1992 | Hunt et al. ..................... 379/88 |
| 5,167,004 A | * 11/1992 | Netsch et al. ................. 704/200 |
| 5,297,194 A | * 3/1994 | Hunt et al. ..................... 379/88 |
| 5,301,109 A | 4/1994 | Landauer et al. |
| 5,317,507 A | 5/1994 | Gallant |
| 5,325,298 A | 6/1994 | Gallant |
| 5,621,859 A | 4/1997 | Schwartz et al. |
| 5,675,819 A | 10/1997 | Schuetze |
| 5,712,957 A | 1/1998 | Waibel et al. |
| 5,839,106 A | 11/1998 | Bellegarda |
| 5,842,165 A | * 11/1998 | Raman et al. ............... 704/255 |
| 5,867,799 A | 2/1999 | Lang et al. |
| 5,895,448 A | * 4/1999 | Vysotsky et al. ........... 704/251 |

OTHER PUBLICATIONS

Bellegarda, Jerome; "A Latent Semantic Analysis Framework For large–Span Language Modeling"; Proc. Euro-Speech '97 Rhodes; Greece; Sep. 1997; pp. 1451–1454.

Bellegarda, Jerome; "A Multispan language Modeling Framework For Large Vocabulary Speech Recognition"; IEEE Transaction On Speech And Audio Processing; vol. 6, No. 5; Sep. 1998; pp. 456–467.

* cited by examiner

Primary Examiner—Susan McFadden
(74) Attorney, Agent, or Firm—Blakely, Sokoloff, Taylor & Zafman LLP

(57) ABSTRACT

A method and system for training a user authentication by voice signal are described. In one embodiment, during training, a set of all spectral feature vectors for a given speaker is globally decomposed into speaker-specific decomposition units and a speaker-specific recognition unit. During recognition, spectral feature vectors are locally decomposed into speaker-specific characteristic units. The speaker-specific recognition unit is used together with selected speaker-specific characteristic units to compute a speaker-specific comparison unit. If the speaker-specific comparison unit is within a threshold limit, then the voice signal is authenticated. In addition, a speaker-specific content unit is time-aligned with selected speaker-specific characteristic units. If the alignment is within a threshold limit, then the voice signal is authenticated. In one embodiment, if both thresholds are satisfied, then the user is authenticated.

42 Claims, 9 Drawing Sheets

COMBINED DUAL SPECTRAL AND TEMPORAL ALIGNMENT METHOD FOR USER AUTHENTICATION BY VOICE

FIELD OF THE INVENTION

The present invention relates to speech or voice recognition systems and more particularly to user authentication by speech or voice recognition.

BACKGROUND OF THE INVENTION

The field of user authentication has received increasing attention over the past decade. To enable around-the-clock availability of more and more personal services, many sophisticated transactions have been automated, and remote database access has become pervasive. This, in turn, heightened the need to automatically and reliably establish a user's identity. In addition to standard password-type information, it is now possible to include, in some advanced authentication systems, a variety of biometric data, such as voice characteristics, retina patterns, and fingerprints.

In the context of voice processing, two areas of focus can be distinguished. Speaker identification is the process of determining which registered speaker provides a given utterance. Speaker verification, on the other hand, is the process of accepting or rejecting the identity of a speaker based upon an utterance. Collectively, they refer to the automatic recognition of a speaker (i.e., speaker authentication) on the basis of individual information present in the speech wave form. Most applications in which a voice sample is used as a key to confirm the identity of a speaker are classified as speaker verification. Many of the underlying algorithms, however, can be applied to both speaker identification and verification.

Speaker authentication methods may be divided into text-dependent and text-independent methods. Text-dependent methods require the speaker to say key phrases having the same text for both training and recognition trials, whereas text-independent methods do not rely on a specific text to be spoken. Text-dependent systems offer the possibility of verifying the spoken key phrase (assuming it is kept secret) in addition to the speaker identity, thus resulting in an additional layer of security. This is referred to as the dual verification of speaker and verbal content, which is predicated on the user maintaining the confidentiality of his or her pass-phrase.

On the other hand, text-independent systems offer the possibility of prompting each speaker with a new key phrase every time the system is used. This provides essentially the same level of security as a secret pass-phrase without burdening the user with the responsibility to safeguarding and remembering the pass-phrase. This is because prospective impostors cannot know in advance what random sentence will be requested and therefore cannot (easily) play back some illegally pre-recorded voice samples from a legitimate user. However, implicit verbal content verification must still be performed to be able to reject such potential impostors. Thus, in both cases, the additional layer of security may be traced to the use of dual verification.

In all of the above, the technology of choice to exploit the acoustic information is hidden Markov modeling (HMM) using phonemes as the basic acoustic units. Speaker verification relies on speaker-specific phoneme models while verbal content verification normally employs speaker-independent phoneme models. These models are represented by Gaussian mixture continuous HMMs, or tied-mixture HMMs, depending on the training data. Speaker-specific models are typically constructed by adapting speaker-independent phoneme models to each speaker's voice. During the verification stage, the system concatenates the phoneme models appropriately, according to the expected sentence (or broad phonetic categories, in the non-prompted text-independent case). The likelihood of the input speech matching the reference model is then calculated and used for the authentication decision. If the likelihood is high enough, the speaker/verbal content is accepted as claimed.

The crux of speaker authentication is the comparison between features of the input utterance and some stored templates, so it is important to select appropriate features for the authentication. Speaker identity is correlated with the physiological and behavioral characteristics of the speaker. These characteristics exist both in the spectral envelope (vocal tract characteristics) and in the supra-segmental features (voice source characteristics and dynamic features spanning several segments). As a result, the input utterance is typically represented by a sequence of short-term spectral measurements and their regression coefficients (i.e., the derivatives of the time function of these spectral measurements).

Since HMMs can efficiently model statistical variation in such spectral features, they have achieved significantly better performance than less sophisticated template-matching techniques, such as dynamic time-warping. However, HMMs require the a priori selection of a suitable acoustic unit, such as the phoneme. This selection entails the need to adjust the authentication implementation from one language to another, just as speech recognition systems must be re-implemented when moving from one language to another. In addition, depending on the number of context-dependent phonemes and other modeling parameters, the HMM framework can become computationally intensive.

SUMMARY OF THE INVENTION

A method and system for training a user authentication by voice signal are described. In one embodiment, during training, a set of all spectral feature vectors for a given speaker is globally decomposed into speaker-specific decomposition units and a speaker-specific recognition unit. During recognition, spectral feature vectors are locally decomposed into speaker-specific characteristic units. The speaker-specific recognition unit is used together with selected speaker-specific characteristic units to compute a speaker-specific comparison unit. If the speaker-specific comparison unit is within a threshold limit, then the voice signal is authenticated. In addition, a speaker-specific content unit is time-aligned with selected speaker-specific characteristic units. If the alignment is within a threshold limit, then the voice signal is authenticated. In one embodiment, if both thresholds are satisfied, then the user is authenticated.

BRIEF DESCRIPTION OF THE DRAWINGS

Features and advantages of the present invention will be apparent to one skilled in the art in light of the following detailed description in which.

DETAILED DESCRIPTION

Figure 1:
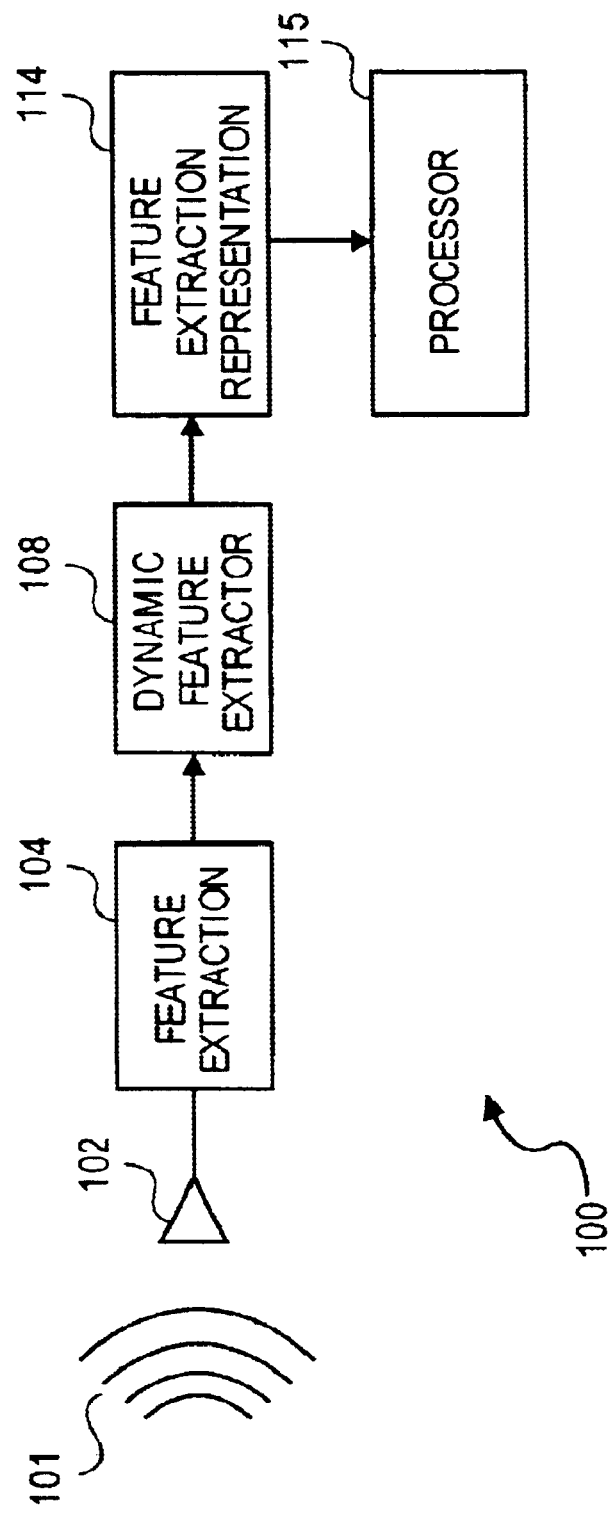
FIG. 1 is a block diagram of one embodiment of a user authentication system.

A method and system for training a user authentication by voice signal are described. In one embodiment, during training, a set of all spectral feature vectors for a given speaker is globally decomposed into speaker-specific decomposition units and a speaker-specific recognition unit. During recognition, spectral feature vectors are locally decomposed into speaker-specific characteristic units. The speaker-specific recognition unit is used together with selected speaker-specific characteristic units to compute a speaker-specific comparison unit. If the speaker-specific comparison unit is within a threshold limit, then the voice signal is authenticated. In addition, a speaker-specific content unit is time-aligned with selected speaker-specific characteristic units. If the alignment is within a threshold limit, then the voice signal is authenticated. In one embodiment, if both thresholds are satisfied, then the user is authenticated.

In one embodiment, a new global representation for an entire utterance is defined by integrating out both spectral and temporal information through the use of singular value decomposition (SVD). The decomposition into a singular value obviates the need to perform the temporal alignment required by the HMM framework. Rather, the input speech and reference model are simply each mapped into a single point in some low-dimensional space. The authentication decision then becomes a matter of computing the distance between the two associated points in that space. The distance computation relies on the decomposition of each input utterance into local and global singular elements. As time warping is no longer required, there is no longer a need for the HMM framework for the alignment of two sequences of feature vectors, nor any dependence on a particular phoneme set. As a result, the method is both fast and language-independent.

While the SVD approach is much less computationally intensive than the HMM framework, it is capable of achieving approximately the same level of performance on spectral content matching. In contrast, performance on temporal alignment cannot be compared, since the way temporal information is handled in the SVD approach has no counterpart in the HMM framework. Nevertheless, SVD performance on temporal alignment is lacking. Because of the linear mapping inherent in the decomposition, the SVD model only encapsulates coarse time variations, while its ability to characterize finer behavior is somewhat minimal. Unfortunately, detecting subtle differences in the delivery of an utterance is often necessary to thwart sophisticated impostors, who might be very skilled at mimicking spectral content (using, for example, illegally recorded material from the speaker they want to impersonate).

To address this problem, in one embodiment, verbal content verification is employed to provide an additional layer of security, although here time warping is unavoidable. Because of the lower dimensionality of the space, however, standard template-matching techniques yield sufficiently good results. Again, this obviates the need for a phoneme set, which means verbal content verification may also be done on a language-independent basis.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

FIG. 1 is a block diagram of one embodiment of a user authentication system 100. Referring to FIG. 1, input device 102 receives a voice input 101 and converts voice input 101 into an electrical signal representative of the voice input 101. Feature extractor 104 receives the electrical signal and samples the signal at a particular frequency, the sampling frequency determined using techniques known in the art. In one embodiment, feature extractor 104 extracts the signal every 10 milliseconds. In addition, feature extractor 104 may use a Fast Fourier Transform (FFT) followed by Filter Bank Analysis on the input signal in order to provide a smooth spectral envelope of the input 101. This provides a stable representation from one repetition to another of a particular speaker's utterances. Feature extraction 104 passes the transformed signal to dynamic feature extractor 108. Dynamic feature extractor 108 extracts the first and second order regression coefficients for every frame of data. The first and second order regression coefficients are concatenated and passed from dynamic feature extractor 108 as feature extraction representation 114. In one embodiment, the feature extraction representation 114 is an M×N matrix, which is a sequence of M feature vectors or frames of dimension N. In one embodiment, M is on the order of a few hundred and N is typically less than 100 for a typical utterance of a few seconds in length. After feature extraction representation 114 is created, the feature representation is globally decomposed into speaker-specific decomposition units and a speaker-specific recognition unit, or locally decomposed into speaker-specific characteristic units by processor 115, and speaker-specific comparison units are computed from the characteristic units and a recognition unit.

User authentication system 100 may be hosted on a processor but is not so limited. In alternate embodiments, dynamic feature extractor 108 may comprise a combination of hardware and software that is hosted on a processor different from authentication feature extractor 104 and processor 115.

Figure 2:
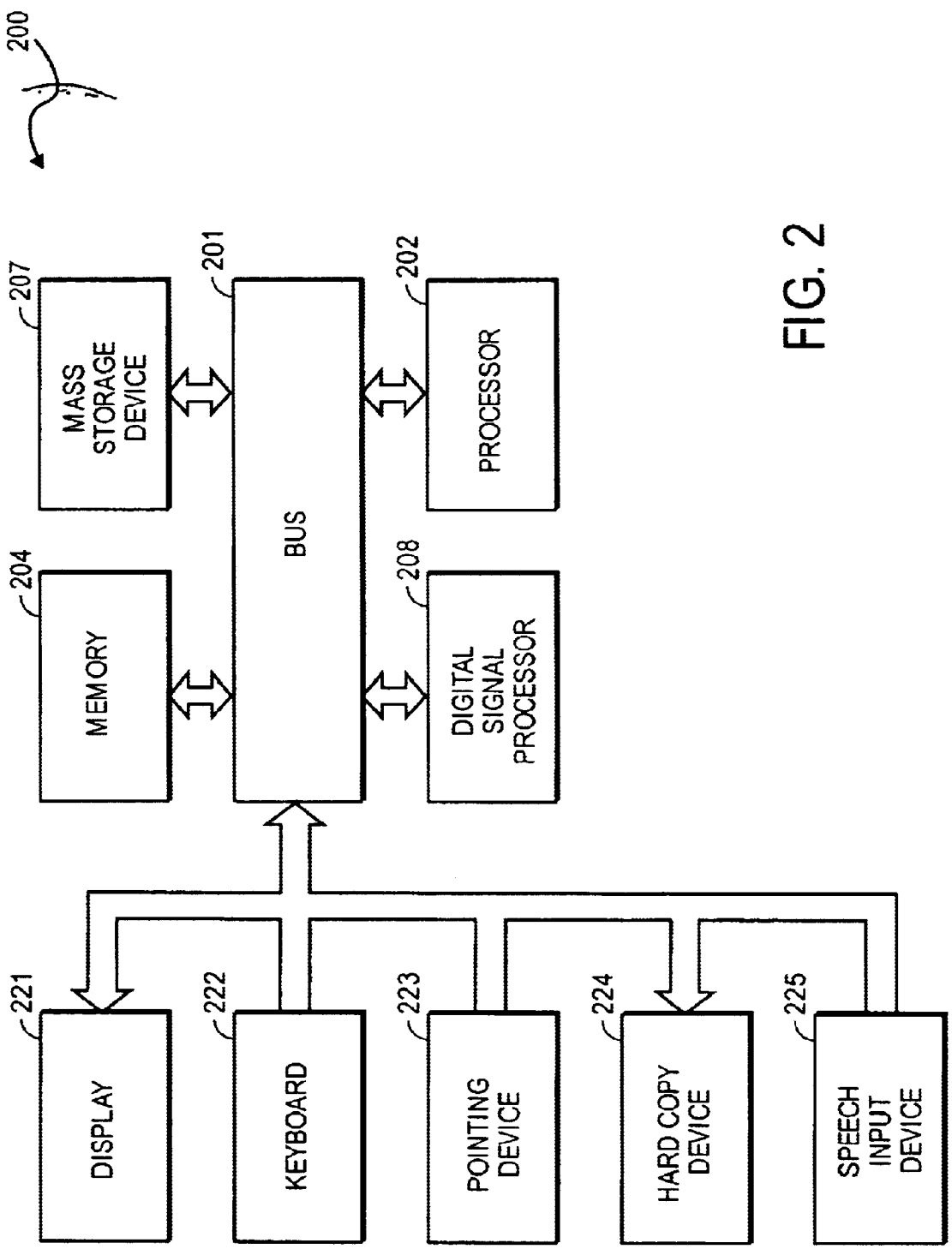
FIG. 2 is a block diagram of one embodiment for a computer system architecture of a user authentication system.

FIG. 2 is a block diagram of one embodiment for a computer system architecture 200 that may be used for user authentication system 100. Referring to FIG. 2, computer system 200 includes system bus 201 used for communication among the various components of computer system 200. Computer system 200 also includes processor 202, digital signal processor 208, memory 204, and mass storage device 207. System bus 201 is also coupled to receive inputs from keyboard 222, pointing device 223, and voice signal input device 225. In addition, system bus 201 provides outputs to display device 221 and hard copy device 224.

Figure 3:
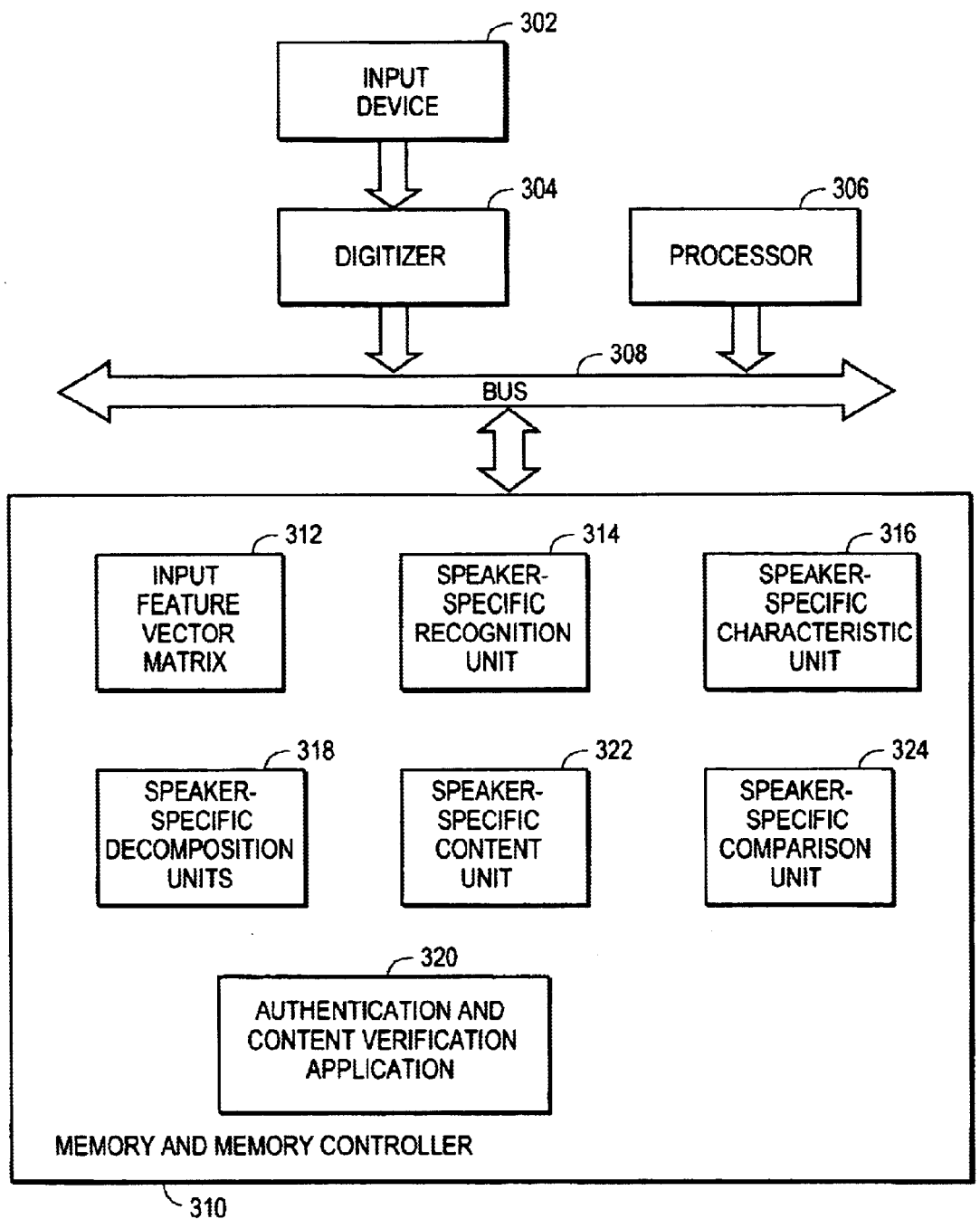
FIG. 3 is a block diagram of one embodiment for a computer system memory of FIG. 2.

FIG. 3 is a block diagram of one embodiment for a computer system memory 310 of a user authentication system 100. Referring to FIG. 3, input device 302 provides voice signals to a digitizer 304. Digitizer 304, or feature extractor, samples and digitize the voice signals for further processing. Digitizer 304 may include storage of the digitized voice signals in the speech input data memory component of memory 310 via system bus 308. Digitized voice signals are processed by digital processor 306 using authentication and content verification application 320.

In one embodiment, digitizer 304 extracts spectral feature vectors every 10 milliseconds. In addition, a short term Fast Fourier Transform followed by a Filter Bank Analysis is used to ensure a smooth spectral envelope of the input spectral features. The first and second order regression coefficients of the spectral features are extracted. The first and second order regression coefficients, typically referred to as delta and delta-delta parameters, are concatenated to create input feature vector matrix 312. Input feature vector matrix 312 is an M×N matrix of frames (F). Within matrix 312, each row represents the spectral information for a frame and each column represents a particular spectral band over time. In one embodiment, the spectral information for all frames and all bands may include approximately 20,000 parameters. In one embodiment, a singular value decomposition (SVD) of the matrix F into local singular elements is computed. A portion of the local elements of the SVD of the matrix F is stored in speaker-specific characteristic units 316.

During training sessions, in order to obtain a distance measure that is better tailored to the problem of user authentication than the previously used Gaussian distance, a global SVD is further applied to the entire set of training utterances from a given speaker. For each speaker, the set is represented by an $\overline{M} \times N$ matrix, with $\overline{M} \approx KM$, where K is the number of training utterances for the speaker. The $\overline{M} \times N$ matrix is denoted by $\overline{F}$, which is globally decomposed into global singular value elements in a manner similar to the local decomposition of matrix F. A selected one of the global singular value elements of the SVD of matrix $\overline{F}$ is stored in a speaker-specific recognition unit 314 for the given speaker.

In one embodiment, the speaker-specific content unit 322 is derived using the classical dynamic time warping (DTW) algorithm. During training, the K training utterances provided by each speaker are "averaged" to define a representative reference utterance $u_R$. The representative reference utterance $u_R$ is stored as the speaker-specific content unit 322.

Memory 310 also includes authentication and content verification application 320, which calculates a speaker-specific comparison unit 324 from the speaker-specific recognition unit 314 and speaker-specific characteristic units 316. If the deviation from diagonality of the speaker-specific comparison unit 324 is within an acceptable threshold or range, the voice signal is authenticated. This deviation from diagonality can be computed using any distance measure, such as by calculating the Frobenius norm of its off-diagonal elements, or any other appropriate method. Otherwise, the voice signal is rejected and the user may be requested to re-input the authentication sentence.

Application 320 further performs a time alignment of selected speaker-specific characteristic units 316 with the speaker-specific content unit 322. During verification, the input sequence of M feature vectors of dimension N, say $u_V$, is acquired and compared to the a speaker-specific content unit 322 defined as reference model $u_R$. The comparison is performed by aligning the time axes of $u_V$ and $u_R$, and computing the degree of similarity between them, accumulated from the beginning to the end of the utterance on a frame by frame basis. Various distance measures are adequate to perform this step, such as Euclidean, or Gaussian, or any other appropriate method. If the degree of similarity is high enough, the voice signal is authenticated. Otherwise, it is rejected.

Application 320 further performs a voting scheme to determine if the voice signal has been authenticated using both the deviation from diagonality and degree of similarity measures. If so, the speaker is accepted as claimed. Otherwise the speaker is rejected and denied access to the system.

Figure 4:
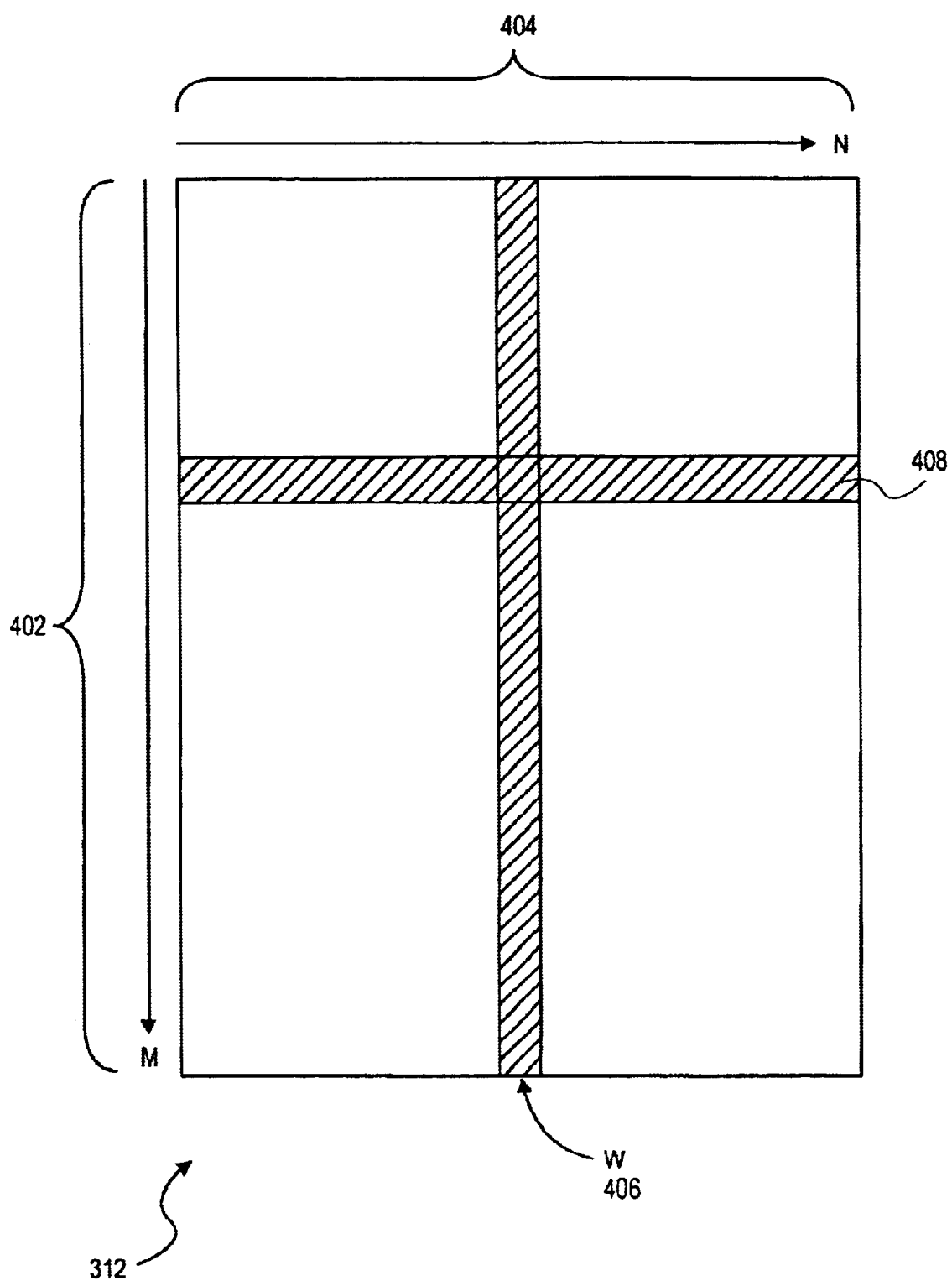
FIG. 4 is a block diagram of one embodiment for an input feature vector matrix of FIG. 3.

FIG. 4 is a block diagram of one embodiment for an input feature vector matrix 312. Input feature vector matrix 312 is a matrix of M feature vectors 420 of dimension N 404. In one embodiment, M is on the order of a few hundred and N is typically less than 100 for an utterance of a few seconds in length. Each utterance is represented by an individual M×N matrix 312 of frames F. Row 408 represents the spectral information for a frame and column 406 represents a particular spectral band over time. In one embodiment, the utterance may be extracted to produce approximately 20,000 parameters (M×N).

Figure 5:
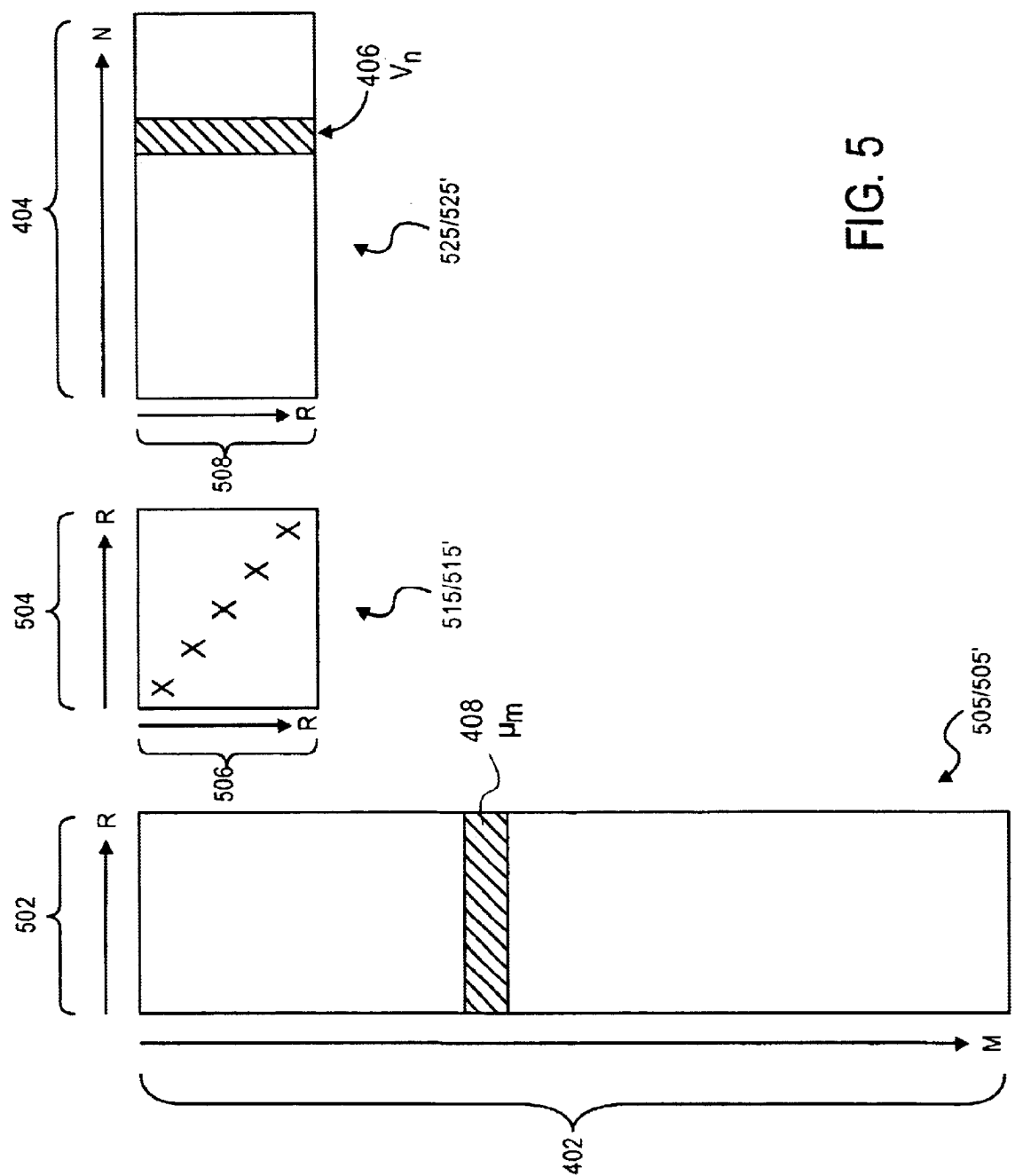
FIG. 5 is a block diagram of one embodiment for the speaker-specific decomposition, recognition, comparison, and characteristic vectors of FIG. 3.

FIG. 5 is a block diagram of one embodiment for determining the speaker-specific decomposition units 318, recognition unit 314, comparison unit 324, and characteristic unit 316.

In one embodiment, local singular value decomposition (SVD) of the matrix F is performed. The decomposition is as follows:

$$F \approx F' = USV^T \tag{1}$$

where U 505 is the M×R matrix of left singular vectors, $U_m(1 \leq m \leq M)$, S 515 is the (R×R) diagonal matrix of singular values $S_r(1 \leq r \leq R)$, and V 525 is the (N×R) matrix of right singular vectors $V_n(1 \leq n \leq N)$, in which R<<M, N is the order of the decomposition, and $^T$ denotes matrix transposition. The local singular value decomposition SVD of the matrix F is stored in speaker-specific decomposition units 318. During recognition, both the S matrix 515 and the V matrix 525 are stored as speaker-specific characteristic units 316.

In one embodiment, global singular value decomposition (SVD) of the matrix $\overline{F}$ is performed. Each speaker to be registered ($1 \leq j \leq J$) provides a small number K, of training sentences. In one embodiment, K=4 and J=40. For each speaker, the set is represented by an $\overline{M} \times N$ matrix, with $\overline{M} \approx KM$, where K is the number of training utterances for the speaker. The $\overline{M} \times N$ matrix is denoted by $\overline{F}$, which is globally decomposed in a manner similar to the local SVD of matrix F as:

$$\overline{F} = \overline{U}\,\overline{S}\,\overline{V}^T, \tag{2}$$

with analogous definitions and properties for the global singular elements $\overline{U}$, $\overline{S}$, and $\overline{V}$ as described for the local singular elements U, S, and V. $\overline{U}$ 505' is the $\overline{M} \times R$ matrix of global left singular vectors, $\overline{U}_m(1 \leq m \leq \overline{M})$, $\overline{S}$ 515' is the (R×R) diagonal matrix of global singular values $S_r(1 \leq r \leq R)$, and $\overline{V}$ 525', is the (N×R) matrix of global right singular vectors $V_n(1 \leq n \leq N)$. Of these global singular elements, only $\overline{V}$ 525' is stored as the speaker-specific recognition unit 314 for the speaker.

The nth left singular vector $u_m$ 408 may be viewed as an alternative representation of the nth frame (that is, the nth eigenvector of the M×M matrix $FF^T$). The nth right singular vector $v_n$ 406 is an alternate representation of the nth spectral band (that is, the nth eigenvector of the N×N matrix 525 $F^T F$). The $U/\overline{U}$ matrix 505/505' comprises eigen-information related to the frame sequence across spectral bands, while the $V/\overline{V}$ matrix 525/525' comprises eigen-information related to the spectral band sequence across time. The $S/\overline{S}$ matrix 515/515' embodies the correlation between the given frame sequence and the given spectral band sequence which includes factors not directly related to the way frames are sequentially generated or spectral bands are sequentially derived. That is, the singular values $S_r$ should contain information that does not depend on the particular utterance text or spectral processing considered such as, for example, speaker-specific characteristics. The $S/\overline{S}$ matrix 515/515' is a diagonal matrix in which each entry in the diagonal of the matrix may be represented by $S_r$. The $S/\overline{S}$ matrix 515/515' may be represented by a vector $s$ containing the R values $s_r$. With this notation, $s$ encapsulates information related to the speaker characteristics.

As already described, during training, a global SVD is performed on the entire set of training utterances for a given speaker to generate a speaker-specific recognition unit 314. During recognition, the speaker-specific characteristic units 316 obtained from the local SVD and the speaker-specific recognition unit 314 are together used to compute $D_{k/l}$, a speaker-specific comparison unit 324.

$$D_{k/l} = (V_k^T V_l)^T S_k (V_k^T V_l), \quad (15)$$

where $V_l$ represents the speaker-specific recognition unit 314 for speaker l, and $S_k$ and $V_k^T$ represent the speaker-specific characteristic units 316 for speaker k. The derivation of the $D_{k/l}$ speaker-specific comparison unit 324 follows.

The set of all training utterances contains the ith utterance, so by selecting the appropriate M rows of $\overline{F}$, we can define:

$$F = \tilde{F}_i = \overline{U}_i \overline{S} \overline{V}^T, \quad (3)$$

as the decomposition of the ith utterance into global singular elements. From (1) and (3), we therefore obtain the equality:

$$U_i S V^T = \overline{U} \overline{S} \overline{V}^T. \quad (4)$$

Before proceeding, we need to prove the lemma that $P = V^T \overline{V}$ is orthonormal. This requires two sets of algebraic manipulations on the expression (4).

First, pre-multiplying and post-multiplying both sides of (4) by $U^T$ and $\overline{V}$, respectively, yields after re-arranging:

$$S = (U^T \overline{U}_i) \overline{S} (\overline{V}^T V), \quad (5)$$

while pre-multiplying and post-multiplying both sides by $U^T$ and $\overline{V}$ respectively, yields:

$$U^T \overline{U}_i = S(V^T \overline{V}) \overline{S}^{-1}. \quad (6)$$

Using (6) into (5), we therefore get after simplification:

$$(V^T \overline{V})(\overline{V}^T V) = I_R. \quad (7)$$

This gives the first part of the result we need.

Similarly, pre-multiplying and post-multiplying both sides of (4) by $\overline{U}_i^T$ and $V$ respectively, yields after re-arranging:

$$(\overline{U}^T U_i) \overline{S} = (\overline{U}_i^T U) S (V^T \overline{V}). \quad (8)$$

while pre-multiplying and post-multiplying both sides by $\overline{U}_i^T$ and $V$, respectively yields:

$$\overline{U}_i^T U = (\overline{U}_i^T U_i) \overline{S} (\overline{V}^T V) S^{-1}, \quad (9)$$

Note that these expressions cannot be streamlined as easily as before since, in general, $\overline{U}_i^T \overline{U}_i \neq I_R$. Using (9) into (8), we nonetheless get after simplification:

$$(\overline{V}^T V)(V^T \overline{V}) = I_R, \quad (10)$$

which is the second part of the result sought. Now with the definition $P = V^T \overline{V}$. (7) and (10) can be combined into:

$$P P^T = P^T P = I_R. \quad (11)$$

which proves that P is both row-and column-orthonormal. In other words, P can be thought of as a rotation matrix in the underlying space of dimension R.

Now, the two expressions (6) and (9) imply:

$$S(V^T \overline{V}) S^{-1} = \overline{S}^{-1} (V^T \overline{V}) \overline{S} (\overline{U}_i^T U_i). \quad (12)$$

Using the lemma (11), (12) can therefore be written as:

$$P^T S^2 P = \overline{S} (\overline{U}_i^T U_i) \overline{S} = \tilde{D}_{\overline{S}}^2, \quad (13)$$

where we have defined the symmetric matrix $D_{\overline{S}}^2$ to represent $\overline{S}(\overline{U}_i^T U_i) \overline{S}$, a transformed version of $\overline{S}^2$. Again invoking the lemma (11), (13) in turn admits the solution:

$$P^T S P = \tilde{D}_{\overline{S}}. \quad (14)$$

From (14), the orthornormal matrix P is seen to define the rotation necessary to map the local singular elements obtained in (1) onto the global singular elements obtained in (2). Note that as V tends to $\overline{V}$ and U tends to $\overline{U}_i$, meaning the local decomposition becomes more and more consistent with the global one, the two sides of (14) become closer and closer to a diagonal matrix, ultimately converging to $\overline{S}$.

This suggests a new metric to evaluation how well a particular utterance is consistent with the global speaker model: compute the quantity $\overline{D}_{\overline{S}} = (V^T \overline{V})^T S (V^T \overline{V})$, and measure how much it deviates from a diagonal matrix. For example, one way to measure the deviation from diagonality is to calculate the Frobenius norm of the off-diagonal elements of the matrix $\overline{D}_{\overline{S}}$.

This further suggests a new metric to evaluate how well a verification utterance, uttered by a speaker k, is consistent with the global model for speaker l. Indexing the local elements by k, and the global elements by l, we define:

$$D_{k/l} = (V_k^T V_l)^T S_k (V_k^T V_l), \quad (15)$$

where $D_{k/l}$ is used as the speaker-specific comparison unit 324, $V_k^T$ and $S_k$ are the speaker-specific characteristic units 316, and $V_l$ is the speaker-specific recognition unit 314.

To measure the deviation from diagonality of the speaker-specific comparison unit $D_{k/l}$ 324, the Frobenius norm is again calculated from its off-diagonal elements. By the same reasoning as before, when $V_k$ tends to $V_l$, $D_{k/l}$ tends to $S_l$, and the Frobenius norm tends to zero. Thus, the deviation from diagonality of speaker-specific comparison unit $D_{k/l}$ 324 can be expected to be less when the verification utterance comes form speaker k=l then when it comes from a speaker k≠l. This distance measure is better tailored to the SVD framework than the Gaussian distance previously proposed. It has been verified experimentally that it also achieves better performance.

Figure 6:
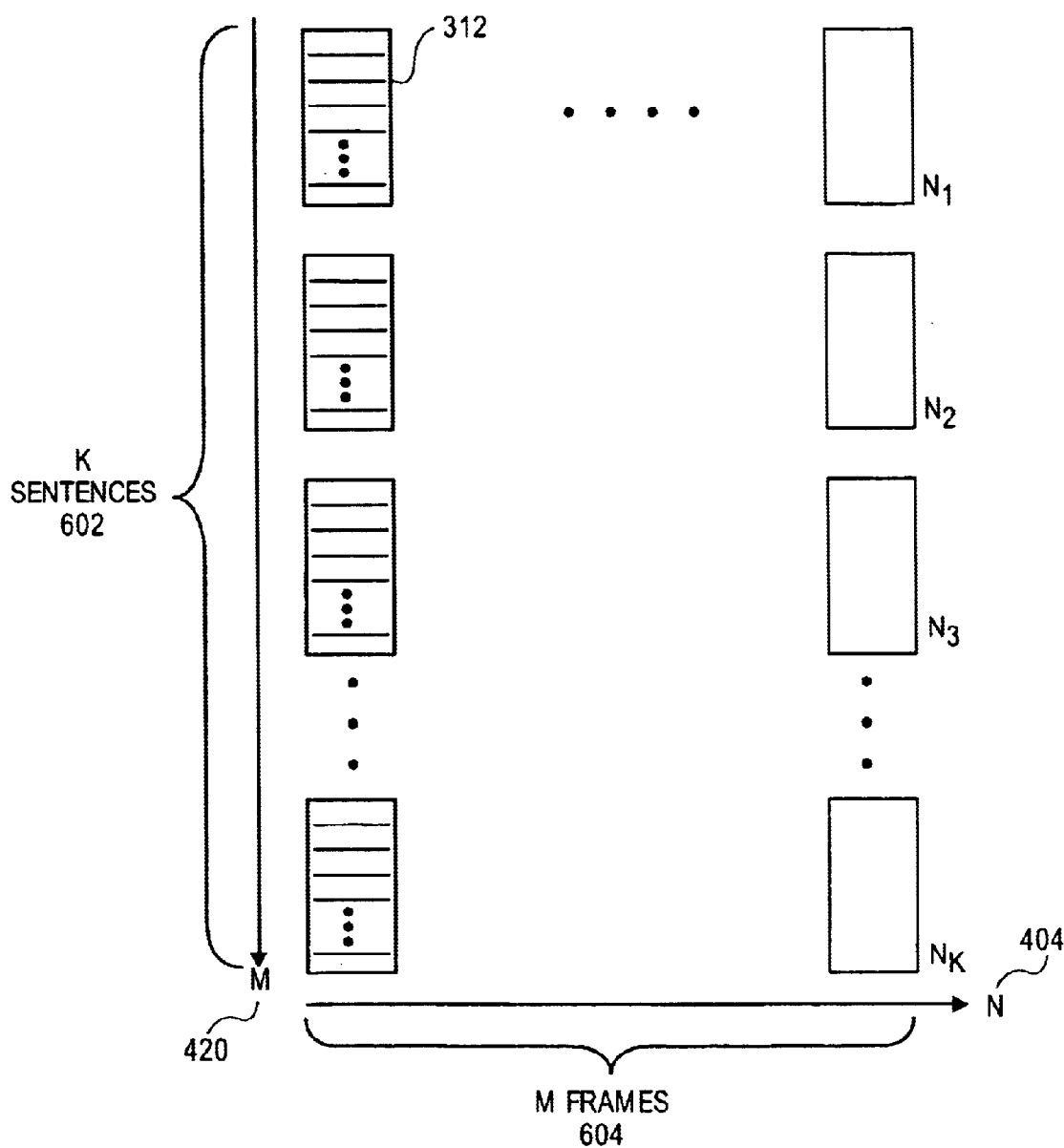
FIG. 6 is a block diagram of one embodiment for speaker-specific content vectors of FIG. 3.

FIG. 6 is a block diagram of one embodiment for an speaker-specific content unit 322. In one embodiment, the speaker-specific content unit 322 is derived using the classical dynamic time warping (DTW) algorithm. During training, the K training utterances provided by each speaker are "averaged" to define a representative reference utterance $u_R$. This is done by producing a canonical representation of the feature extraction representation 114, a matrix of M feature vectors 420 of dimension N 404. In one embodiment, M is on the order of a few hundred and N is typically less than 100 for an utterance of a few seconds in length. Each utterance is represented by an individual M×N matrix 312 of frames F. The canonical representation is computed:

$$L(u_R) = \frac{N_1 + N_2 + \ldots N_k}{K},$$

thereby setting the length of $u_R$ to the average length of all K training utterances, and warping each frame appropriately to come up with the reference frame at that time. The representative reference utterance $u_R$ is stored as the speaker-specific content unit 322.

Figure 7:
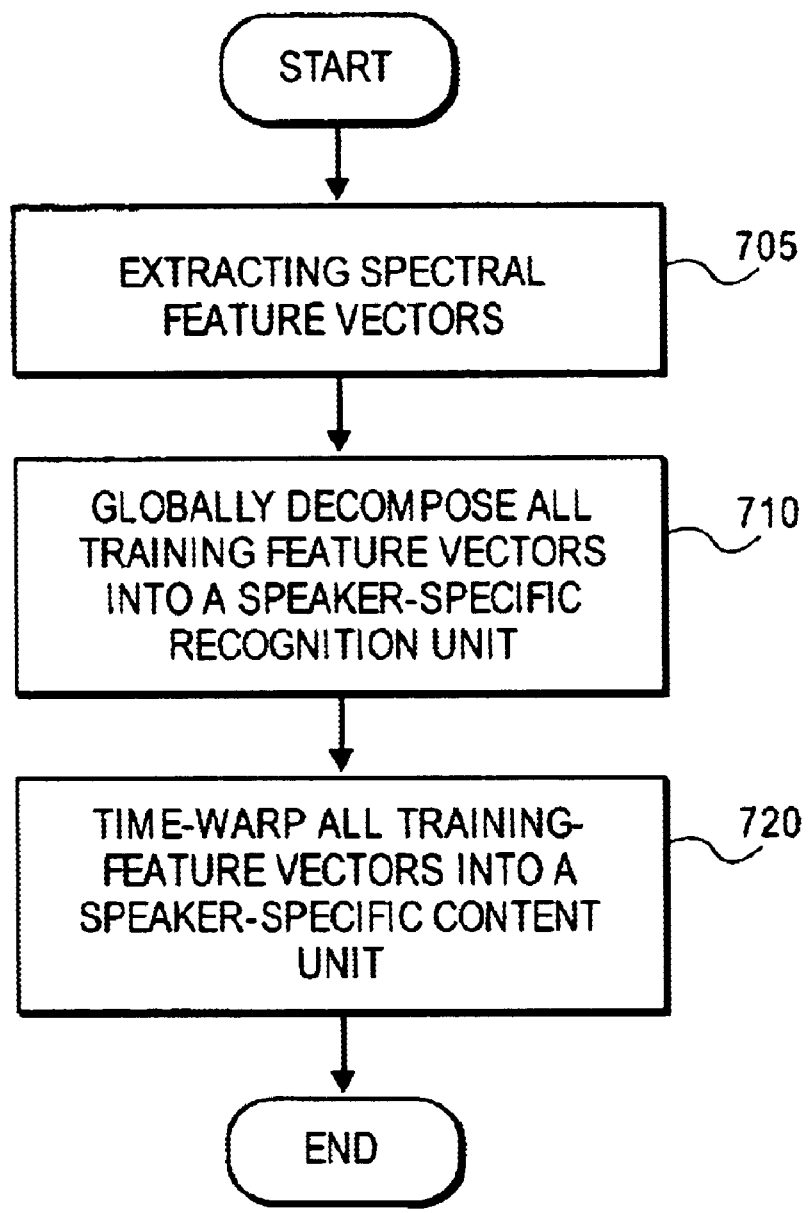
FIG. 7 is a flow diagram of one embodiment for user authentication by voice training.

FIG. 7 is a flow diagram of one embodiment for a user authentication by voice training. Initially at processing block 705, the spectral feature vector s for a user are extracted. The user to be registered provides a small number of training sentences. In one embodiment, the user provides K=4 sentences. Each sentence is digitized into an individual input feature vector matrix 312.

At processing block 710, all of the input feature vector matrices 312 are globally decomposed into a speaker-specific recognition unit 314. The global decomposition is as described in reference to FIG. 5. The global decomposition results in single vector $V_l$, the (N×R) matrix of global right singular vectors $V_n (1 \leq n \leq N)$ for each set of training sentences for each speaker l.

At processing block 720, all of the input feature vector matrices 312 are classically time-warped into a speaker-specific content unit 322. The time-warping is as described in reference to FIG. 6. The time warping results in a representative reference utterance $u_R$, which has an length $L(u_R)$ equal to the average length of all K training utterances.

Figure 8A:
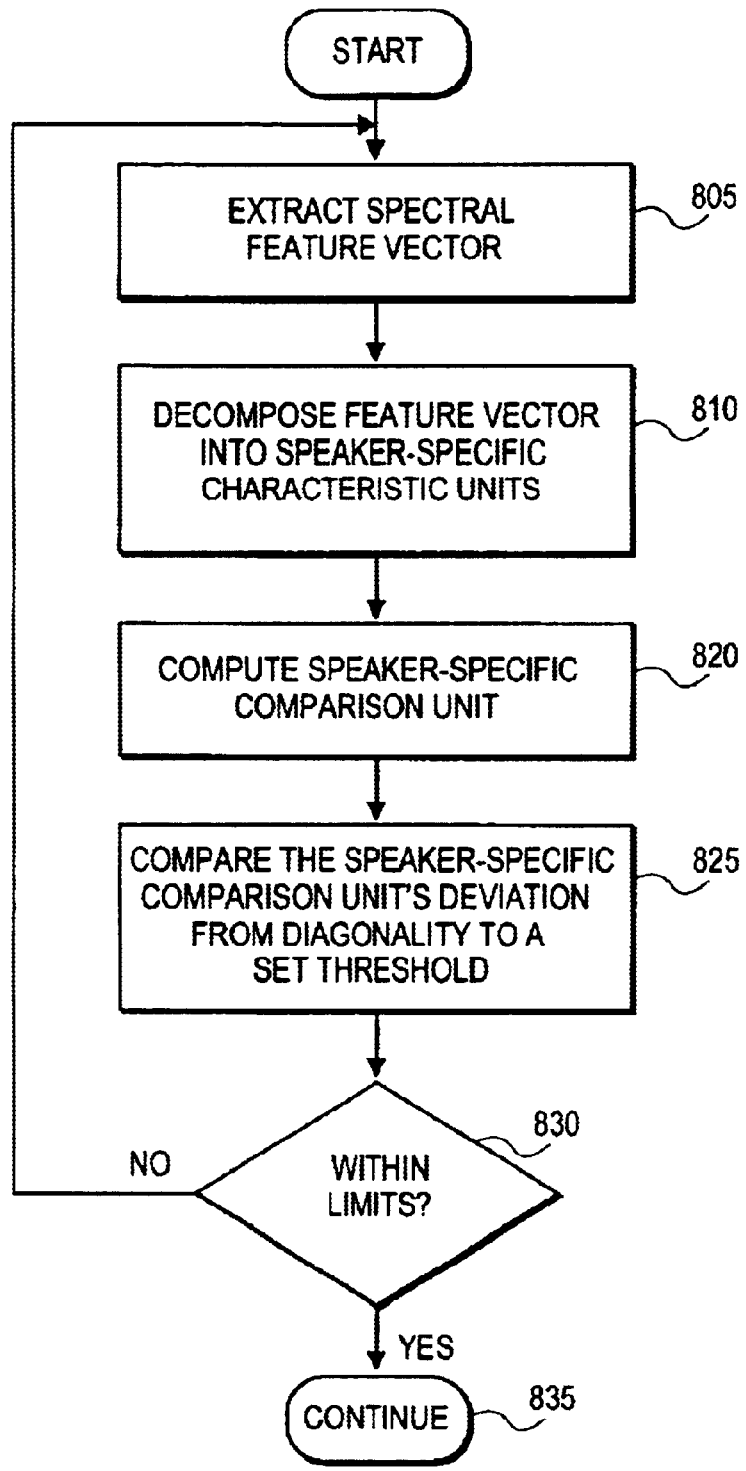
FIGS. 8a–8b is a flow diagram of one embodiment for user authentication by voice.
Figure 8B:
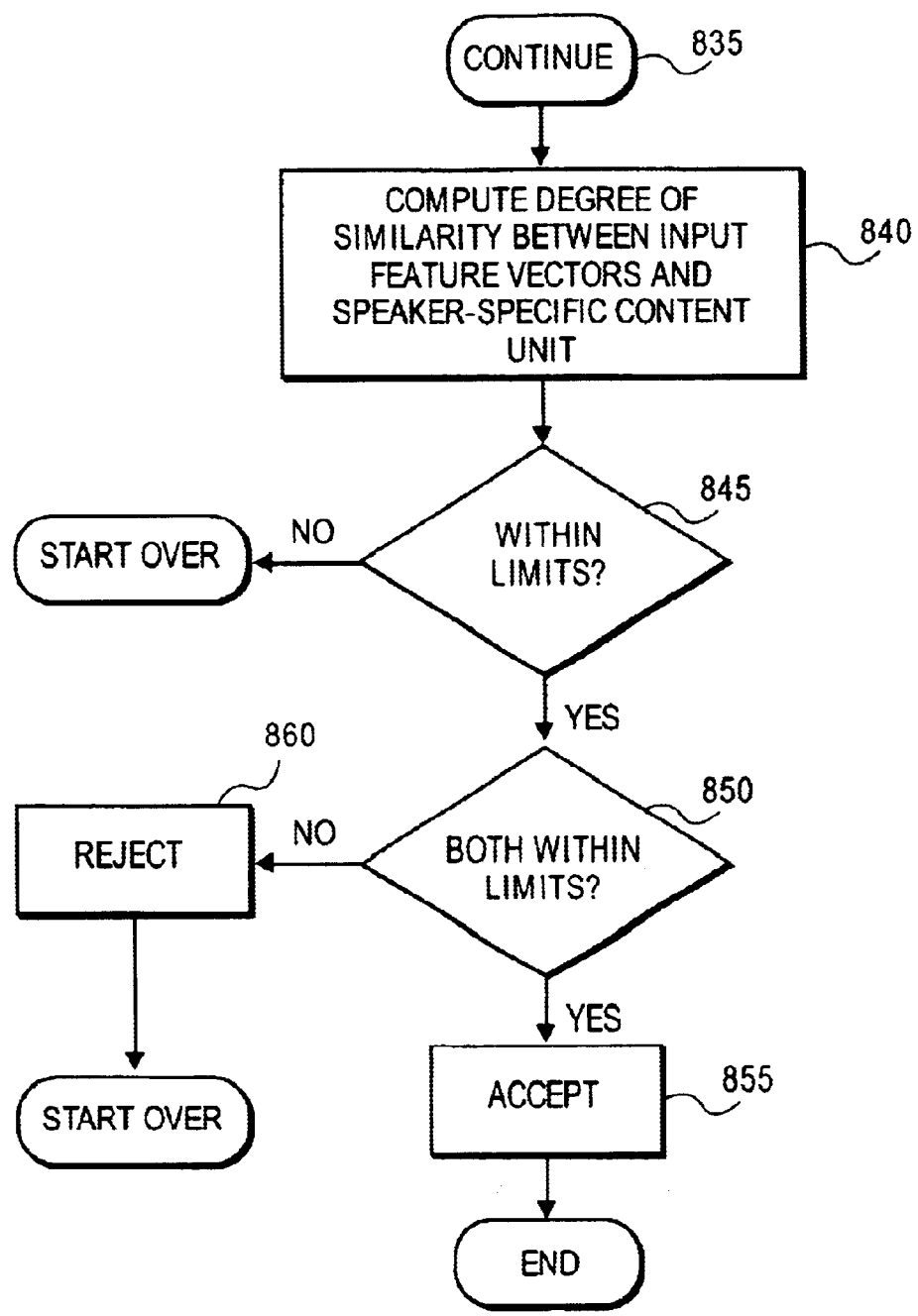

FIGS. 8a–8b is a flow diagram of one embodiment for user authentication by voice. Initially at processing block 805, a spectral feature vector is extracted for an input access sentence. The extraction process is similar to the extraction process of processing block 705 above.

At processing block 810, in one embodiment, the input feature vector matrices 312 is locally decomposed into $V_k^T$ and $S_k$, the speaker-specific characteristic units 316. The local decomposition is as described in reference to FIG. 5. The decomposition results in the characteristic $S_k$ (R×R) diagonal matrix of singular values $S_r (1 \leq r \leq R)$, and characteristic $V_k^T$ (N×R) matrix of right singular vectors $V_n (1 \leq n \leq N)$, for each speaker k.

At processing block 820, the speaker-specific characteristic units 316 obtained from the local SVD and the speaker-specific recognition unit 314 obtained from the global SVD during training are together used to compute $D_{k/l}$, a speaker-specific comparison unit 324.

$$D_{k/l} = (V_k^T V_l)^T S_k (V_k^T V_l), \quad (15)$$

where $V_l$ represents the speaker-specific recognition unit 314 for speaker l, and $S_k$ and $V_k^T$ represent the speaker-specific characteristic units 316 for speaker k. The derivation of the $D_{k/l}$ speaker-specific comparison unit 324 is described in reference to FIG. 5.

At processing block 825, the deviation from diagonality of the speaker-specific comparison unit $D_{k/l}$ 324 is compared to a set threshold limit. To measure deviation from diagonality of the speaker-specific comparison unit $D_{k/l}$ 324, the Frobenius norm is again calculated from its off-diagonal elements. By the same reasoning as before, when $V_k$ tends to $V_l$, $D_{k/l}$ tends to $S_l$, and the Frobenius norm tends to zero. Thus, the deviation from diagonality of speaker-specific comparison unit $D_{k/l}$ 324 can be expected to be less when the verification utterance comes form speaker k=l then when it comes from a speaker k≠l. This distance measure is better tailored to the SVD framework than the Gaussian distance previously proposed. It has been verified experimentally that it also achieves better performance.

At processing block 830, if the deviation from diagonality falls within the set threshold, then the voice signal authentication is acceptable and the authentication process continues at processing block 835 with verbal content verification of the input access sentence.

If at processing block 830, the deviation from diagonality is not within the threshold limit, the user authentication is rejected and, in one embodiment, the user is returned to the beginning, at processing block 805, for input and retry of the input access sentence.

At processing block 840, in one embodiment, for verbal content verification, the input sequence of input feature vectors 312, a matrix of M feature vectors 420 of dimension N 404, say $u_V$, is acquired and compared to the speaker-specific content unit 322 reference model $u_R$. This is done by aligning the time axes of $u_V$ and $u_R$, and computing the degree of similarity between them, accumulated from the beginning to the end of the utterance on a frame by frame basis. Various distance measures are adequate to perform this step, including the Gaussian distance. If, at processing block 845, the degree of similarity is high enough, the voice signal authentication is accepted, and the authentication process continues. Otherwise, at processing block 845, the user authentication is rejected and, in one embodiment, the user is returned to the beginning, at processing block 805, for input and retry of the input access sentence.

At processing block 850, both the spectral and temporal alignment results of process blocks 825 and 835 are interrogated. At processing block 855, the user authentication is accepted as claimed only if both processes successfully authenticated the voice signal. Otherwise, at processing block 860, the user authentication is rejected and, in one embodiment, the user is returned to the beginning, at processing block 805, for input and retry of the input access sentence. In one embodiment, the user may be allowed to attempt to enter the user authentication by voice a given number of times before the process terminates.

The above system was implemented and released as one component of the voice login feature of MacOS9. When tuned to obtain an equal number of false acceptances and false rejections, it operates at an error rate of approximately 4%. This figure is comparable to what is reported in the literature for HMM-based systems, albeit obtained at a lower computational cost.

The specific arrangements and methods herein are merely illustrative of the principles of this invention. Numerous modifications in form and detail may be made by those skilled in the art without departing from the true spirit and scope of the invention.

What is claimed is:

1. A method of training a user authentication by voice signal, the user authentication based on measuring diagonality deviations, the method comprising:

globally decomposing a set of a plurality of feature vectors into at least one speaker-specific decomposition unit; and computing a speaker-specific recognition unit from the at least one speaker-specific decomposition unit for subsequent derivation of the diagonality deviations.

2. The method of claim 1 further comprising:

extracting the set of a plurality of feature vectors into at least one speaker-specific feature extraction representation; and globally decomposing the at least one speaker-specific feature extraction representation into the speaker-specific recognition unit.

3. The method of claim 2 wherein globally decomposing further comprises:

applying a global singular value decomposition to the at least one speaker-specific feature extraction representation.

4. The method of claim 1 further comprising:

generating the speaker-specific recognition unit from a singular value matrix of a global singular value decomposition of the set of a plurality of feature vectors.

5. The method of claim 1 further comprising:

locally decomposing at least one spectral feature vector into at least one speaker-specific characteristic unit;

computing a speaker-specific comparison unit from the at least one speaker-specific characteristic unit and the speaker-specific recognition unit; and authenticating the user if a measurement of the diagonality deviation for the speaker-specific comparison unit is within a first threshold limit.

6. The method of claim 5 wherein decomposing further comprises:

applying a local singular value decomposition to the at least one spectral feature vector.

7. The method of claim 5 further comprising:

aligning a time axis of the at least one spectral feature vector with a time axis of a speaker-specific content unit previously trained by the user; and further authenticating the user if the time axes are aligned within a second threshold limit.

8. The method of claim 1 further comprising:

time warping the plurality of feature vectors into a speaker-specific content unit.

9. A method of authenticating a voice signal comprising:

locally decomposing at least one spectral feature vector into at least one speaker-specific characteristic unit;

computing a speaker-specific comparison unit from the at least one speaker-specific characteristic unit and a speaker-specific recognition unit previously trained by a user; and authenticating the user if a measurement of a diagonality deviation for the speaker-specific comparison unit is within a first threshold limit.

10. The method of claim 9 further comprising:

globally decomposing a plurality of feature vectors into a speaker-specific recognition unit.

11. The method of claim 10 further comprising:

extracting a set of the plurality of feature vectors into a speaker-specific feature extraction representation; and globally decomposing the speaker-specific feature extraction representation into the speaker-specific recognition unit.

12. The method of claim 11 wherein globally decomposing further comprises:

applying a global singular value decomposition to the speaker-specific feature extraction representation.

13. The method of claim 10 further comprising:

generating the speaker-specific recognition unit from a singular value matrix of a global singular value decomposition of the set of a plurality of feature vectors.

14. The method of claim 9 wherein locally decomposing further comprises:

applying a local singular value decomposition to the at least one spectral feature vector.

15. The method of claim 9 further comprising:

generating the at least one speaker-specific characteristic unit from a singular value matrix of a local singular value decomposition of the at least one spectral feature vector.

16. The method of claim 7 further comprising:

aligning a time axis of the at least one spectral feature vector with a time axis of a speaker-specific content unit, the speaker-specific content unit previously trained by the user; and further authenticating the user if the time axes are aligned within a second threshold limit.

17. A system for training a user authentication by voice signal, the user authentication based on measuring diagonality deviations, the system comprising:

a processor configured to globally decompose a set of a plurality of feature vectors into at least one speaker-specific decomposition unit, and select a speaker-specific recognition unit from the at least one speaker-specific decomposition unit for subsequent derivation of the diagonality deviations.

18. The system of claim 17, wherein the processor is further configured to align a time axis of the at least one spectral feature vector with a time axis of a speaker-specific content unit previously trained by the user, and authenticate the user if the time axes are aligned within a second threshold limit.

19. The system of claim 17 further comprising:

a feature extractor to extract the set of a plurality of feature vectors into at least one speaker-specific feature extraction representation.

20. The system of claim 19 wherein the processor is further configured to globally decompose the at least one speaker-specific feature extraction representation into the speaker-specific recognition unit.

21. The system of claim 20 wherein the processor is further configured to apply a global singular value decomposition to the speaker-specific feature extraction representation to generate the speaker-specific recognition unit.

22. The system of claim 17 wherein the processor is further configured to generate the speaker-specific recognition unit from a singular value matrix of a global singular value decomposition of the set of a plurality of feature vectors.

23. The system of claim 18 wherein the processor is further configured to locally decompose at least one spectral feature vector into at least one speaker-specific characteristic unit, and authenticate the 'user if a measure of the diagonality deviation for a speaker-specific comparison unit is within a first threshold limit, the speaker-specific comparison unit having been previously computed from the at least one speaker-specific characteristic unit and the speaker-specific recognition unit.

24. The system of claim 23 wherein the processor is further configured to apply a singular value decomposition to the at least one spectral feature vector.

25. The system of claim 17, wherein the processor is further configured to time warp the plurality of feature vectors into a speaker-specific content unit.

26. A system for authenticating a voice signal comprising:
a processor to locally decompose at least one spectral feature vector into at least one speaker-specific characteristic unit, compute a speaker-specific comparison unit from the at least one speaker-specific characteristic unit and a speaker-specific recognition unit previously trained by a user, and authenticate the user if a measurement of a diagonality deviation for the speaker-specific comparison unit is within a first threshold limit.

27. The system of claim 26 wherein the processor is further configured to generate the at least one speaker-specific characteristic unit from a singular value matrix of a local singular value decomposition of the at least one feature vector.

28. The system of claim 26 wherein the speaker-specific recognition unit is globally decomposed from a set of a plurality of feature vectors.

29. The system of claim 28 further comprising:
a feature extractor to extract the set of a plurality of feature vectors into a speaker-specific feature extraction representation.

30. The system of claim 29 wherein the processor is further configured to globally decompose the speaker-specific feature extraction representation into at least one speaker-specific decomposition unit, and select the speaker-specific recognition unit from the at least one speaker-specific decomposition unit.

31. The system of claim 30 wherein the processor is further configured to apply a global singular value decomposition to the speaker-specific extraction representation to generate the speaker-specific recognition unit.

32. The system of claim 28 wherein the processor is further configured to generate the speaker-specific recognition unit from a singular value matrix of a global singular value decomposition of the set of a plurality of feature vectors.

33. The system of claim 26 wherein the processor is further configured to apply a singular value decomposition to the at least one spectral feature vector.

34. The system of claim 26, wherein the processor is further configured to align a time axis of the at least one spectral feature vector with a time axis of a speaker-specific content unit previously trained by the user, and 'authenticate the user if the time axes are aligned within a second threshold limit.

35. A system for training a user authentication by voice signal, the user authentication based on measuring diagonality deviations, the system comprising:
means for globally decomposing a set of a plurality of feature vectors into at least one speaker-specific decomposition unit; and
means for computing a speaker-specific recognition unit from the at least one speaker-specific decomposition unit for subsequent derivation of the diagonality deviations.

36. The system of claim 35 further comprising:
means for time warping the plurality of feature vectors into a speaker-specific content unit.

37. A computer readable medium comprising instructions, which when executed on a processor, perform a method for training a user authentication by voice signal, the user authentication based on measuring diagonality deviations, the method comprising:
globally decomposing a set of a plurality of feature vectors into at least one speaker-specific decomposition unit; and
selecting a speaker-specific recognition unit from the at least one speaker-specific decomposition unit for subsequent derivation of the diagonality deviations.

38. The computer readable medium of claim 37, wherein the method further comprises:
time warping the plurality of feature vectors into a speaker-specific content unit.

39. A system for authenticating a voice signal comprising:
means for locally decomposing at least one spectral feature vector into at least one speaker-specific characteristic unit;
means for computing a speaker-specific comparison unit from the at least one speaker-specific characteristic unit and a speaker-specific recognition unit previously trained by a user; and
means for authenticating the user if a measurement of a diagonality deviation for the speaker-specific comparison unit is within a first threshold limit.

40. The system of claim 39 further comprising:
means for aligning a time axis of the at least one spectral feature vector with a time axis of a speaker-specific content unit previously trained by the user, and the means for authenticating further authenticating the user if the time axes are aligned within a second threshold limit.

41. A computer readable medium comprising instructions, which when executed on a processor, perform a method for authenticating a voice signal, comprising:
locally decomposing at least one spectral feature vector into at least one speaker-specific characteristic unit;
computing a speaker-specific comparison unit from the at least one speaker-specific characteristic unit and a speaker-specific recognition unit previously trained by a user; and
authenticating the user if a measurement of a diagonality deviation for the speaker-specific comparison unit is within a first threshold limit.

42. The computer readable medium of claim 41, wherein the method further comprises:
aligning a time axis of the at least one spectral feature vector with a time axis of a speaker-specific content unit previously trained by the user; and
further authenticating the user if the time axes are aligned within a second threshold limit.

* * * * *